United States Patent [19]
Perrot

[11] Patent Number: 5,206,554
[45] Date of Patent: Apr. 27, 1993

[54] ELECTROMAGNETIC MICROMOTOR FOR USE IN WATCH MOVEMENTS OF SMALL DIMENSIONS

[75] Inventor: Friedrich Perrot, Lengnau, Switzerland

[73] Assignee: Eta SA Fabriques d'Ebauches, Granges, Switzerland

[21] Appl. No.: 655,811

[22] Filed: Feb. 15, 1991

[30] Foreign Application Priority Data

Feb. 19, 1990 [CH] Switzerland .................. 00527/90

[51] Int. Cl.⁵ .................. H02K 7/10; H02K 5/02; H02K 5/04
[52] U.S. Cl. .................. 310/40 MM; 310/43; 310/89
[58] Field of Search ........... 310/DIG. 6, 40 MM, 83, 310/89, 91, 261, 273, 43

[56] References Cited

U.S. PATENT DOCUMENTS

| | | | |
|---|---|---|---|
| 3,390,289 | 6/1968 | Dijken et al. ................. | 310/42 |
| 4,126,933 | 11/1978 | Anderson et al. ................. | 29/598 |
| 4,318,017 | 3/1982 | Migeon et al. ................. | 310/42 |
| 4,412,144 | 10/1983 | Denison et al. ................. | 310/49 R |
| 4,484,094 | 11/1984 | Ade et al. ................. | 310/43 |
| 4,931,679 | 6/1990 | Fournier ................. | 310/71 |

FOREIGN PATENT DOCUMENTS

| | | | |
|---|---|---|---|
| 74145 | 11/1960 | France . | |
| 1302143 | 6/1962 | France ................. | 310/40 MM |
| 1302692 | 6/1962 | France ................. | 310/40 MM |
| 53-5109 | 4/1978 | Japan . | |
| 53-43924 | 4/1978 | Japan . | |
| 53-114761 | 9/1978 | Japan . | |

*Primary Examiner*—Steven L. Stephan
*Assistant Examiner*—D. R. Haszko
*Attorney, Agent, or Firm*—Griffin, Butler, Whisenhunt & Kurtossy

[57] ABSTRACT

The invention concerns an electromagnetic micromotor. Such micromotor includes a rotor constituted by a permanent magnet (52) partially embedded in an overmolding (54) formed from plastic material and which is provided with coupling means to a driven mechanism, a cage (60) including a bottom and a cover and intended to be engaged in the interior of a stator while the rotor is mounted for free rotation in the cage, and rotation guide means for the rotor (50) in the cage (60), such micromotor being characterized in that the rotation guide means are constituted, on the one hand, by two housings (74, 76) coaxially arranged in the overmolding (54), and on the other hand, by two spindles (78, 80) respectively integral with the bottom and the cover of the cage and intended to be accommodated respectively in one of these housings. Such micromotor is intended to equip timepiece movements of very small dimensions, for instance for ladies' watches.

11 Claims, 3 Drawing Sheets

ELECTROMAGNETIC MICROMOTOR FOR USE IN WATCH MOVEMENTS OF SMALL DIMENSIONS

This invention concerns a micromotor of the electromagnetic type.

More specifically, it concerns an electromagnetic micromotor intended to equip a watch movement of small dimensions such as those employed in ladies' watches.

BACKGROUND OF THE INVENTION

Electromagnetic micromotors of standard construction such as that shown on FIG. 1, which equip the majority of electromechanical watch movements of the analog or digital type, include a rotor constituted by a permanent magnet which is partially or indeed totally embedded in the interior of an overmolding formed of an injected plastic material.

Such rotor is mounted to be free in rotation in the interior of a generally cylindrical cage, the outer periphery of which is precision fitted in a stator.

Thus, for the moving assembly of the rotor, the overmolding includes at its two longitudinal extremities, spindles or pivots which are coaxial with the geometric axis of the rotor and are obtained with material from the body of the overmolding.

These spindles, which are thus also formed from injected plastic, are accommodated in corresponding housings arranged respectively in the bottom of the cage and in its cover.

Such type of motor to the present time has given entire satisfaction, in particular, on the one hand, thanks to the precision of the positioning of the rotor relative to the stator and on the other hand thanks to its extremely compact conception.

Nevertheless, its construction appears to be unsuited and limited whenever there is a question of incorporating it in movements of small dimension such as those for ladies' watches.

Effectively, when efforts are made to further miniaturize a watch movement, one is obliged to miniaturize the battery equipping such.

The diminution of the volume of the battery brings about a substantial reduction of the available energy.

Thus, in order to be able to offer the user sufficient autonomy of operation, it is necessary to limit the consumption of the movement.

One of the paths enabling response to this requirement is to increase the efficiency of the motor and this by diminishing the losses due to friction.

Such first problem being stated, it has been considered that a possible mechanical solution was to diminish the diameter of the rotor spindles in order to obtain a reduction of the friction couple.

Unfortunately, following numerous trials, the injection of these spindles has appeared to be almost impossible below a certain diameter.

Effectively, in most cases, the spindles have shown defects in structure and alignment which have rendered impossible their function as rotation guiding elements.

Furthermore, it has been possible to determine that below a certain threshold value, it was difficult and thus expensive to obtain the housings, respectively in the bottom and the cover of the cage, in which are accommodated the spindles or pivots of the rotor by drilling or by die forming because of the very frequent breakages and damage to the drill bits and punches. In view of these determinations, it has been logically presumed that the classic micromotor as described hereinabove could not be used to equip a watch movement which was further miniaturized, its limits of efficiency and dimensions being attained.

Thus, the invention has as purpose to remove this obstacle by proposing an electromagnetic micromotor of a conception close to that classic micromotor, i.e. constituted from an overmolding rotor pivotally mounted in a cage, but offering a higher efficiency so as to be capable of being energized with a sufficient autonomy of operation by a battery of lesser capacity.

SUMMARY OF THE INVENTION

To this effect, the invention has as its objective an electromagnetic micromotor of the type comprising a rotor constituted by a permanent magnet, at least partially embedded in an overmolding formed from a plastic material, such overmolding including a mechanical coupling means for a mechanism to be driven, a cage in the interior of which said rotor is freely mounted in rotation, said cage being bounded at a first end by a bottom and at a second end by a cover and intended to be inserted into the interior of a stator, and first and second means for guiding the rotor in rotation within the cage, such means being arranged on the overmolding of said rotor as well as respectively on the bottom and on the cover of said cage, characterized in that the aforesaid first and second rotation guide means are constituted on the one hand by two housings arranged coaxially in said overmolding of plastic material and on the other hand by two spindles or pivots which are respectively fixed to the bottom and the cover of the cage and which are intended to be accommodated in one of said housings.

It is thus understood that with such an arrangement one may lessen in a significant manner the respective diameters of the spindles on the bottom of the cage and on its cover which are thus no longer formed of injected plastic material, but henceforth from a metallic material for instance, which may be machined by profile turning. Furthermore, it has been possible to reconcile the necessities of miniaturization and the advantages inherent in the classic micromotor structure (precision and compactness) by conserving the conception of the overmolding rotor freely pivoting on the interior of an intermediate insertable cage.

It will also be specified that the spindle of the first guide means preferably is formed of material common with the bottom of the cage.

But further characteristics and advantages of the invention will better appear following reading of the detailed description taken with reference to the annexed drawings, which are given by way of example.

DESCRIPTION OF THE PREFERRED EMBODIMENTS

Figure 1:
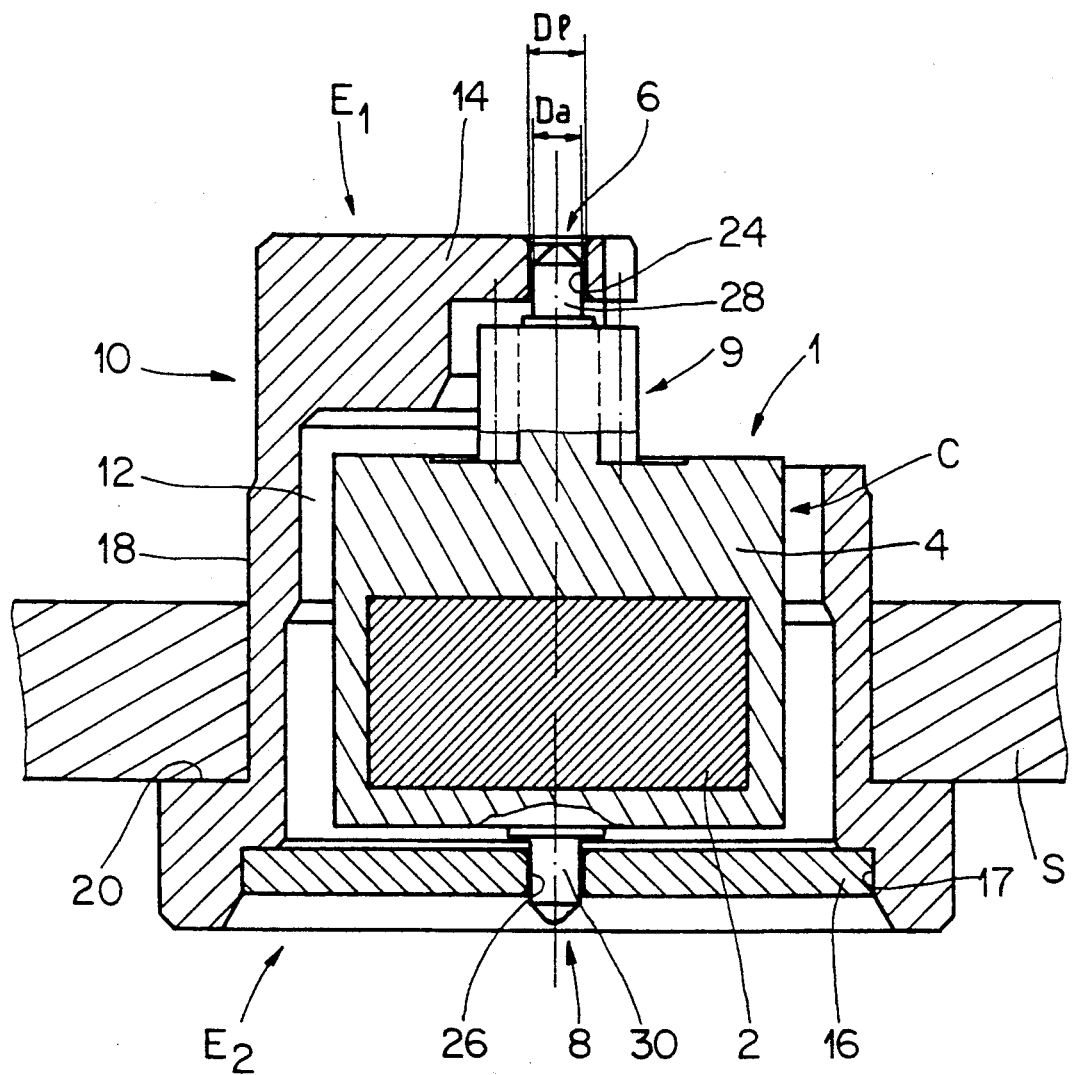
FIG. 1 is a view in longitudinal cross-section of an electromagnetic micromotor of the classic type.

Referring initially to FIG. 1, there will be described a classic electromagnetic motor until now employed in numerous watch movements.

Such motor includes a rotor 1 constituted by a permanent magnet 2 which is, in this example, partially embedded in the interior of an overmolding of plastic material 4. Such overmolding of plastic material 4, which assumes a substantially ;cylindrical form, includes at its two opposed longitudinal extremities first and second rotation guide means respectively 6 and 8.

Between the first rotation guide means 6 and the body C of the overmolding 4 is arranged a pinion 9, the number of teeth of which is generally chosen to be between 6 and 10.

The rotor 1 is assembled to be movable in rotation in the interior of a cage 10 which has a substantially cylindrical form. Such cage 10 exhibits an interior cavity 12 in which is accommodated rotor 1 and which is partially closed at its first extremity E1 by a bottom 14 integral with the material of cage 10 and at its second extremity E2 by an inset cover 16.

Cover 16 is driven into a recess 17 provided in cage 10 proximate its end E2.

Additionally, cage 10 exhibits an outer periphery 18 which is precision trued and limited proximate the second extremity E2 by a shoulder 20.

Thus, the cage is particularly conformed in order to be brought into engagement and to be positioned with precision within a stator S, which enables a very precise, rapid and reproducible adjust of the rotor relative to stator S.

Furthermore, the bottom 14 and cover 16 include respectively a bored out orifice or housing 24, 26. In these two bored orifices or housings 24 and 26 are respectively engaged spindles or pivots 28 and 30 integral with the material of the overmolding 4. Thus, the orifices 24 and 26 and spindles 28 and 30 form respectively in pairs, the first and second rotation guide means 6 and 8 of rotor 1 on the interior of cage 10.

It is thus understood that spindles 28 and 30, pinion 9 and the body C of the overmolding form only one piece, coming integrally from the same material, such monolithic piece being formed by a standard technique of injection.

As has been explained previously, the miniaturization of this type of motor has come up against the limits of injection of spindles 28 and 30 which, in most cases, below a certain threshold, are incapable of fulfilling their function of guiding the rotor 1 in rotation. It can be specified that the minimum diameter Da of the spindles or pivots 28 and 30 which has been attainable, is on the order of $0.16 \cdot 10^{-3}$ meter (0.16 mm). One has also come up against the limits in forming the orifices or housings 24 and 26 because of the insufficient resistance of the tools, such as drill bits or punches. The minimum diameter D1 of these housings 24, 26 which has been attainable is on the order of $0.14 \cdot 10^{-3}$ meter (0.14 mm).

Figure 2:
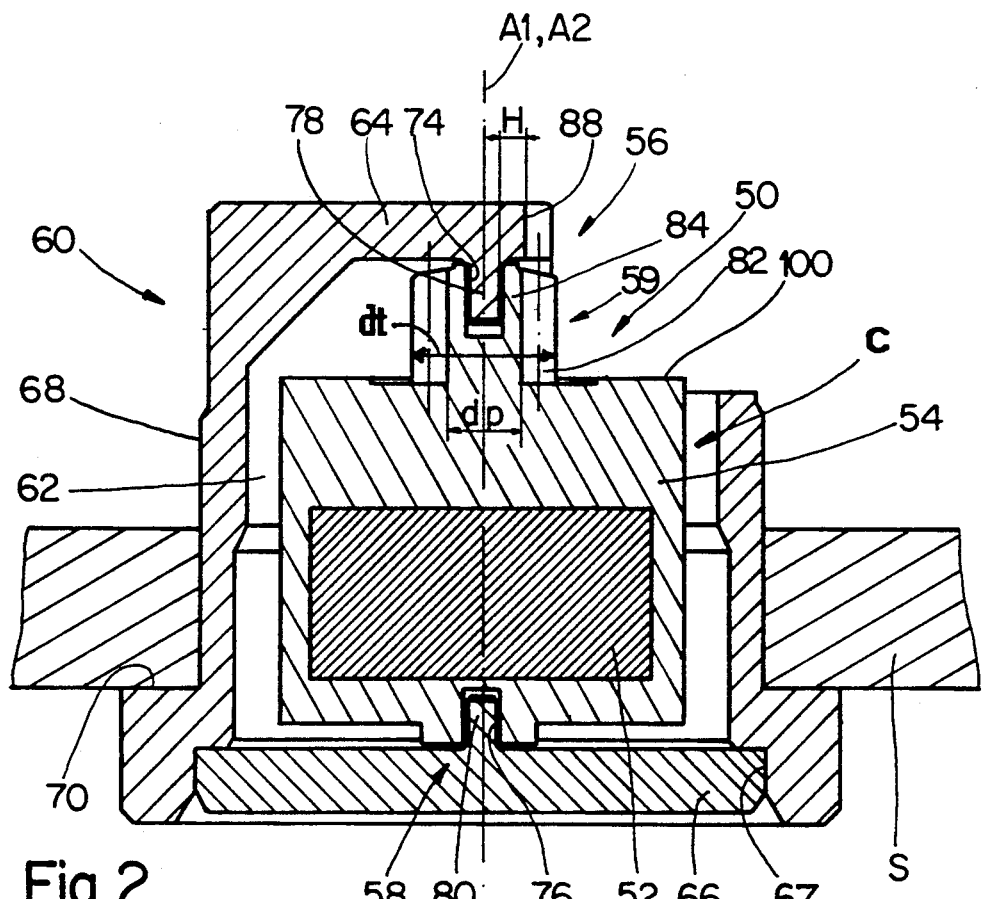
FIG. 2 is a longitudinal cross-section of a first embodiment of an electromagnetic micromotor according to the invention, taken along line II—II of FIG. 3.
Figure 3:
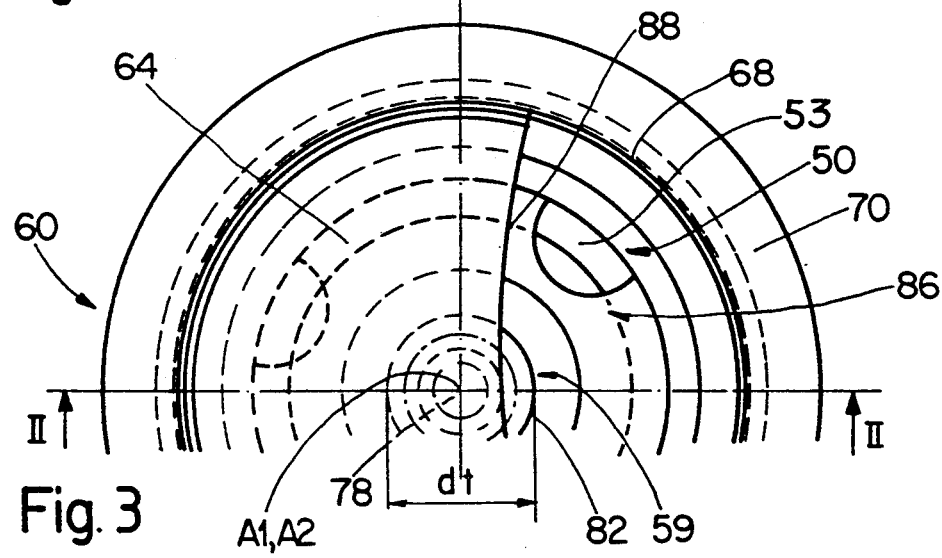
FIG. 3 is a top view of the micromotor of FIG. 2.

In referring henceforth to FIGS. 2 and 3, one finds represented an electromagnetic micromotor according to the invention. It will be noted that such micromotor is of a conception quite close to that of the micromotor of FIG. 1 and that it conserves all the characteristics which give rise to the interest therein, technical as well as commercial.

Effectively, the micromotor of FIG. 2 includes a rotor 50 provided with a permanent cylindrical magnet 52 which in this example is partially embedded in the interior of an overmolding of plastic material 54. The overmolding 54 is constituted by a body C one end of which is extended by a pinion 59.

The body C of overmolding 54 includes several notches 53 (FIG. 3) partially freeing the permanent magnet 52. Such notches 53 represent "the imprint" of supporting elements which enable support of the permanent magnet 52 during the injection of the overmolding 54.

Pinion 59 is provided with teeth 82 (generally 6 to 10) which extend to the corresponding lateral face 100 of the body C of the overmolding 54. Such teeth 82 form an extension of the lateral face 100, being integral with the material of the body C. The rotor, having a substantially cylindrical form, exhibits a longitudinal geometric axis A1 while the face 100 forms one of the bases of the body C.

In the same manner, rotor 50 is mounted to be free in rotation on the interior of a cage 60 which includes an interior cavity 62 bounded on the one hand by a bottom 64 coming from the same material and on the other hand by a cover 66 which is inset and driven into a recess 67 of the cage 60.

Cage 60 includes in the same manner an outer periphery 68 conformed in order to be fitted into the stator Such outer periphery 68 is bounded on the side of the recess 67 by a shoulder 70 which is brought to bear on stator S. It will be noted furthermore that the bottom 64 does not completely close the cavity 62 in order to permit access to pinion 59 and meshing thereof with a mechanism to be driven (not shown).

Such micromotor includes first and second rotation guide means 56 and 58 for the rotor 50 on the interior of the cage 60, the conception of which has enabled successfully proceeding still further in its miniaturization and in that of the movement which it equips. Such guide means permit rotation of the rotor 50 around a geometric axis A2 which is arranged longitudinally in cage 60 and which is merged with the axis A1 of the rotor 50.

It will be noted that these rotation guide means are constituted on the one hand by two blind cylindrical housings respectively 74 and 76 arranged in a coaxial manner in the overmolding 54 and on the other hand by two spindles or pivots 78 and 80 respectively fixed to the bottom 64 and the cover 66 of the cage 60.

The spindle 78 which projects from the bottom 64 of the cage in the direction of its cavity 62 is accommodated in housing 74 of the overmolding 54 and constitutes, with such housing 74, the first rotation guide means of the rotor 50, while the spindle 80 which projects from the cover 66 towards the cavity 62 is fitted into housing 76 of the overmolding 54 and constitutes with the latter the second rotation guide means of the rotor.

Housing 74 is constituted by a cylindrical orifice arranged in the body of pinion 59 in the center of the latter. In other words, housing 74 is arranged abreast of teeth 59 at the same level as the latter. Thus, the teeth 82 of such pinion 59 constitute stiffening members which reinforce the rigidity of the wall 84 bounding the housing 74. One may thus determine that in a very advantageous manner the structure of pinion 59 is brought to cooperate mechanically with wall 84 of housing 74 and offers in this conception a new function other than that of the standard meshing with a gear of a mechanism. Thus, since one may provide a wall 84 of small thickness, it is not necessary to increase the diameter dp which is the diameter of the foot of pinion 59 and one may thus conserve a minimum number of teeth on such pinion 59.

On the other hand, it can be specified that in a preferred embodiment, the spindle 78 comes from material common with the bottom 64 of cage 60, such spindle 78 being obtained by turning - profile turning from the cavity 62. This embodiment is very economic since it avoids the mounting of an inserted spindle which is a solution generally substantially more expensive because of the problems of transport and mounting.

Additionally, at this exact place, that is to say on the bottom 64, such arrangement offers other advantages.

As will be noted on FIG. 3, the bottom 64 of cage 60 is notched as indicated by arrow 86 in order to fit the teeth 82 of the pinion 59 into a corresponding gear by axial translation of cage 60 into stator S. Pinion 59 having very small diameters of the foot dp and the head dt, because of the limited number of teeth and of the modulus of such teeth which must be sufficient to assure an acceptable shear resistance, it is necessary to arrange a relatively large notch and to eliminate material on the bottom 64 almost up to the rotation axis A2 of rotor 50.

Figure 5:
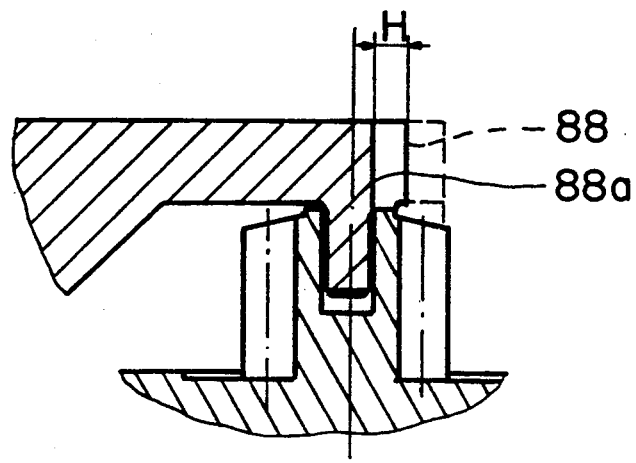
FIG. 5 is an enlarged view of a machined zone of the bottom of the cage which equips a micromotor according to a third embodiment.

As may be observed on FIGS. 2 and 3, there remains only a very small thickness of material between the outer periphery of the spindle 78 and the machined face 88 of the bottom 64. This zone of material, which is referenced H on FIG. 2 exhibits a very small thickness. During trials which have been effected with a stepped spindle assembled in the bottom 64, it was possible to observe that the zone of material H which has a very small mechanical resistance, was cracking during efforts to drive the spindle into the bottom 64. It is for such reason that the conception of the axis 78 coming from material common with the bottom 64 appears extremely advantageous. Additionally, in this case as in that of the classic motor of FIG. 1, such zone of material which is indispensable must exhibit at the level of the spindle (assembled and driven or fitted and pivoting) a thickness such that the distance between the face 88 and the axis of rotation A is at least equal to the half of the diameter of the foot dp, in order to permit the engagement with a corresponding gear and correct meshing with the latter. One can specify also that thanks to this solution, the zone of material H may be partially, indeed entirely eliminated as is shown on FIG. 5, which permits setting back the position of the machined face 88 and providing a new face 88a formed within greater manufacturing tolerances. It can also be specified that thanks to this arrangement, it has been possible to diminish the diameters of the foot dp and the head dt of pinion 59 relative to the classic micromotor of FIG. 1, which enables reducing the number of teeth 82 for a same tooth modulus.

Figure 4:
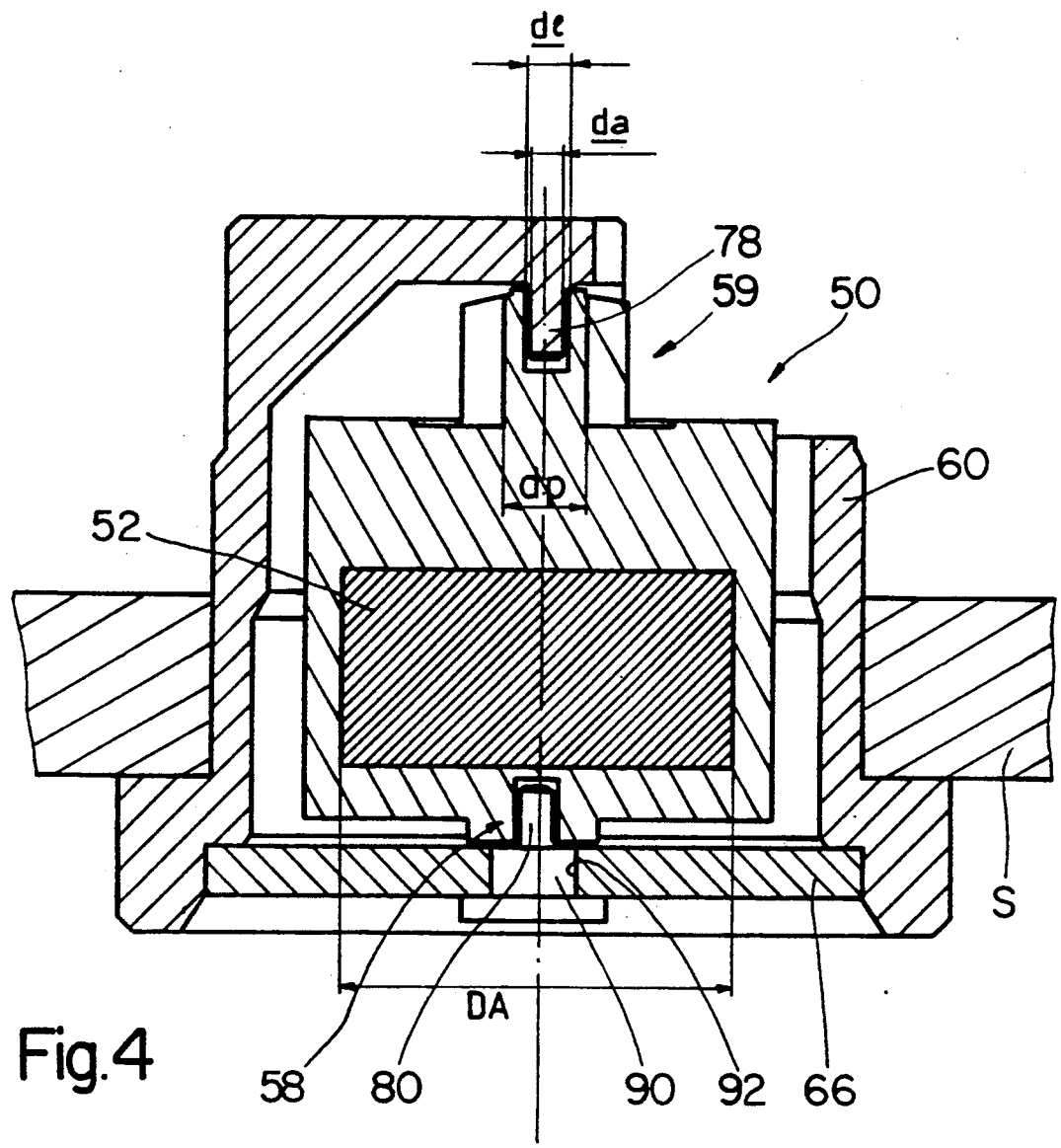
FIG. 4 is similar to FIG. 2, but shows a second embodiment of a micromotor in accordance with the invention.

By way of example, it can be specified that the diameter da (FIG. 4) of spindles 78 and 80 which have been attainable thanks to this arrangement, has a value of $0.11 \cdot 10^{-3}$ meter (0.11 mm). The diameter dl of the housings 74 and 76 which have been obtained is on the order of $0.13 \cdot 10^{-3}$ (0.13 mm).

In order better to situate these micromotor dimensions according to the invention, it is indicated furthermore that the diameters of the foot dp and the head dt of the pinion 59 are respectively about $0.24 \cdot 10^{-3}$ meter (0.24 mm) and about $0.5 \cdot 10^{-3}$ meter (0.5 mm). The diameter DA of the permanent magnet is about $1.2 \cdot 10^{-3}$ meter (1.2 mm).

Continuing according to the first embodiment, it will be noted that the spindle 80 of the second rotation guide means 58 is obtained with material from the cover 66 of the cage 60. At the same time, and as is shown on FIG. 4, in a second embodiment the spindle 80 is provided on a stud 90 which is assembled and force mounted (driven) into a corresponding bored housing 92 provided in the cover 66. This arrangement is particularly advantageous since it enables obtaining spindle 80 from a material different from that of the cage 60, indeed from that of cover 66. Effectively, the cage and eventually cover 66 are formed from brass for reasons of magnetic permeability, while spindle 80 and stud 90 with which it is integral, may be formed from steel.

From this fact, spindle 80 exhibits a shear resistance which permits, for a same diameter as that of spindle 78, to withstand lateral shocks much greater than that of spindle 78. It will be noted effectively that the permanent magnet 52 is substantially displaced towards cover 66 and thus towards spindle 80 which undergoes loads much greater than spindle 78 during lateral shocks.

It can also be specified that thanks to this difference in material, the two spindles 78 and 80 may exhibit different diameters.

It is understood thus that this conception, in which the spindles are respectively integral with the cage and the bottom, and in which the housings are formed in the overmolding during its injection over the permanent magnet, answers perfectly the miniaturization problems of a watch movement thanks to the possible increase in efficiency of the motor. Such conception also permits the miniaturization of the micromotor itself which would compensate its loss of power (lessening of the volume of the magnet) by such increase in efficiency. Furthermore, it is noted that the structure of the pinion such as it is arranged in the overmolding enhances the mechanical resistance of one of these housings obtained in such overmolding. Furthermore, the spindles may be obtained of different materials to the extent that the more stressed of the two may exhibit mechanical characteristics of a greater order for a same diameter.

Additionally, spindles 78 and. 80 in being henceforth formed of a metallic material, offer a shear resistance greater than that of spindles 28 and 30 of the classic micromotor of FIG. 1 which are of a plastic material and this even with a substantial reduction of the diameter of such spindles 78 and 80.

What is claimed is:

1. An electromagnetic micromotor of the type comprising;

a rotor constituted by a permanent magnet at least partially embedded in an overmolding formed from a plastic material, such overmolding including a mechanical coupling means for a mechanism to be driven, a cage including an interior cavity defined therein by a peripheral wall and a bottom integral with said peripheral wall, said interior cavity being closed by a cover inset into the cage to house therein said rotor which is freely mounted in rotation within said cavity, said bottom having a notch to open said cavity outwardly in order to enable said mechanical coupling means of said overmolding of said rotor to mesh with said mechanism to be driven, and first and second rotation guide means for guiding the rotor in rotation within the cage, said first and second rotation guide means being arranged on the overmolding of said rotor as well as respectively on the bottom and on the cover of said cage, said first and second rotation guide means being constituted, on the rotor, by two housings arranged coaxially in said overmolding of plastic material, and on the cage by two spindles or pivots which project inwardly, within the interior cavity and which are respectively fixed on the bottom and the cover of the cage and at least one said spindle or pivot is accommodated in one of the aforesaid housings, the spindle or pivot of said first guide means and said cage bottom comprising a monolithic structure and said notch comprising a machined face provided close to said spindle or pivot of said first rotation guide means.

2. A micromotor as set forth in claim 1 wherein said machined face shows a set back position so that a zone of material between said machined face and the spindle integral with said bottom is eliminated.

3. A micromotor as set forth in claim 1 wherein the spindle or pivot of the second guide means is obtained with material from the cage cover.

4. A micromotor as set forth in claim 1 wherein the spindle or pivot of the second guide means is inserted into the cover.

5. A micromotor as set forth in claim 4 wherein the inserted spindle or pivot is force mounted into said cover.

6. A micromotor as set forth in claim 1 wherein the two spindles of the two guide means have different diameters.

7. A micromotor as set forth in claim 1 wherein the two spindles are formed from different materials.

8. A micromotor as set forth in claim 1 in which the coupling means is constituted by a pinion obtained with material from the body of the overmolding, the housing of the first rotation guide means being arranged in the body of the pinion at the height of the teeth of such pinion which teeth form a stiffener and rigidify the wall defining said housing.

9. A micromotor as set forth in claim 1 in which said spindles or pivots are both made of metallic material.

10. A micromotor as set forth in claim 1 in which said spindle or pivot integral with said bottom of the cage is obtained by turning-profile turning.

11. An electromagnetic micromotor comprising:
a rotor comprising a permanent magnet at least partially embedded in an overmolding of a plastic material, said overmolding including a mechanical coupling means for a mechanism to be driven,
a cage in the interior of which said rotor is freely mounted for rotation, said cage being bounded at a first end by a bottom and at a second end by a cover and intended to be inserted into the interior of a stator, and
first and second rotation guide means for guiding the rotor in rotation within the cage, said rotation guide means being arranged on the overmolding of said rotor as well as respectively on the bottom and on the cover of said cage, said first and second rotation guide means being constituted, on the rotor, by two housings arranged coaxially in said overmolding of plastic material, and on the cage by two spindles or pivots which are respectively fixed on the bottom and the cover of the cage, one said spindle or pivot being accommodated in each of said housings, said bottom and the spindle or pivot of the first rotation guide means fixed to the bottom comprising a monolithic mass of material.

* * * * *